Nov. 23, 1954　　W. R. KAHLE ET AL　　2,694,960
PISTON WEIGHING AND TRIMMING MACHINE
Filed Dec. 22, 1949　　　　　　　　　　　　11 Sheets-Sheet 2
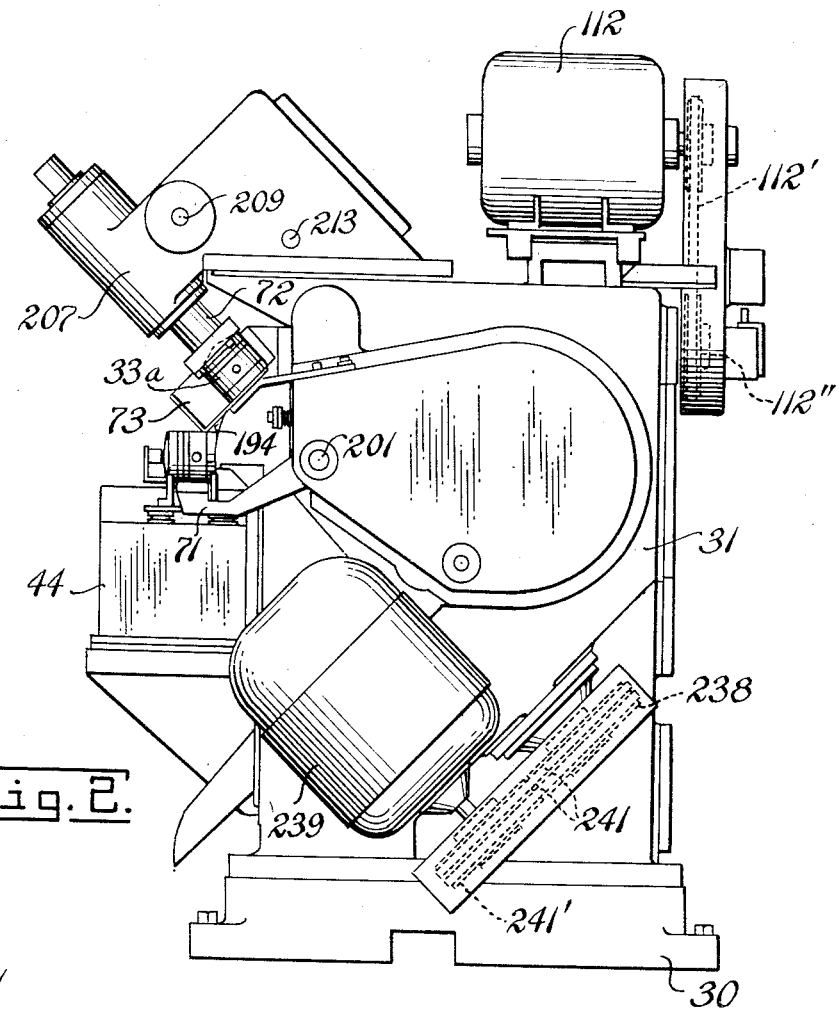
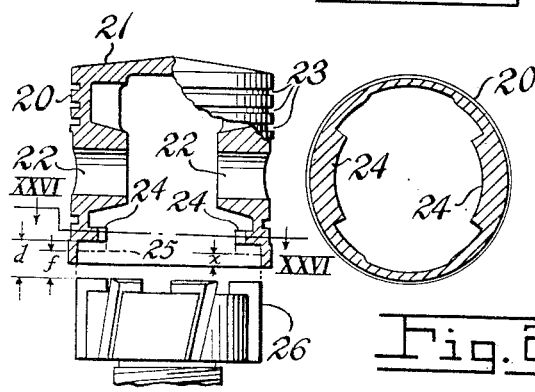
INVENTORS.
WALTER R. KAHLE
EDWARD R. JOHNSON
BY
Zugelter & Zugelter
Attys.

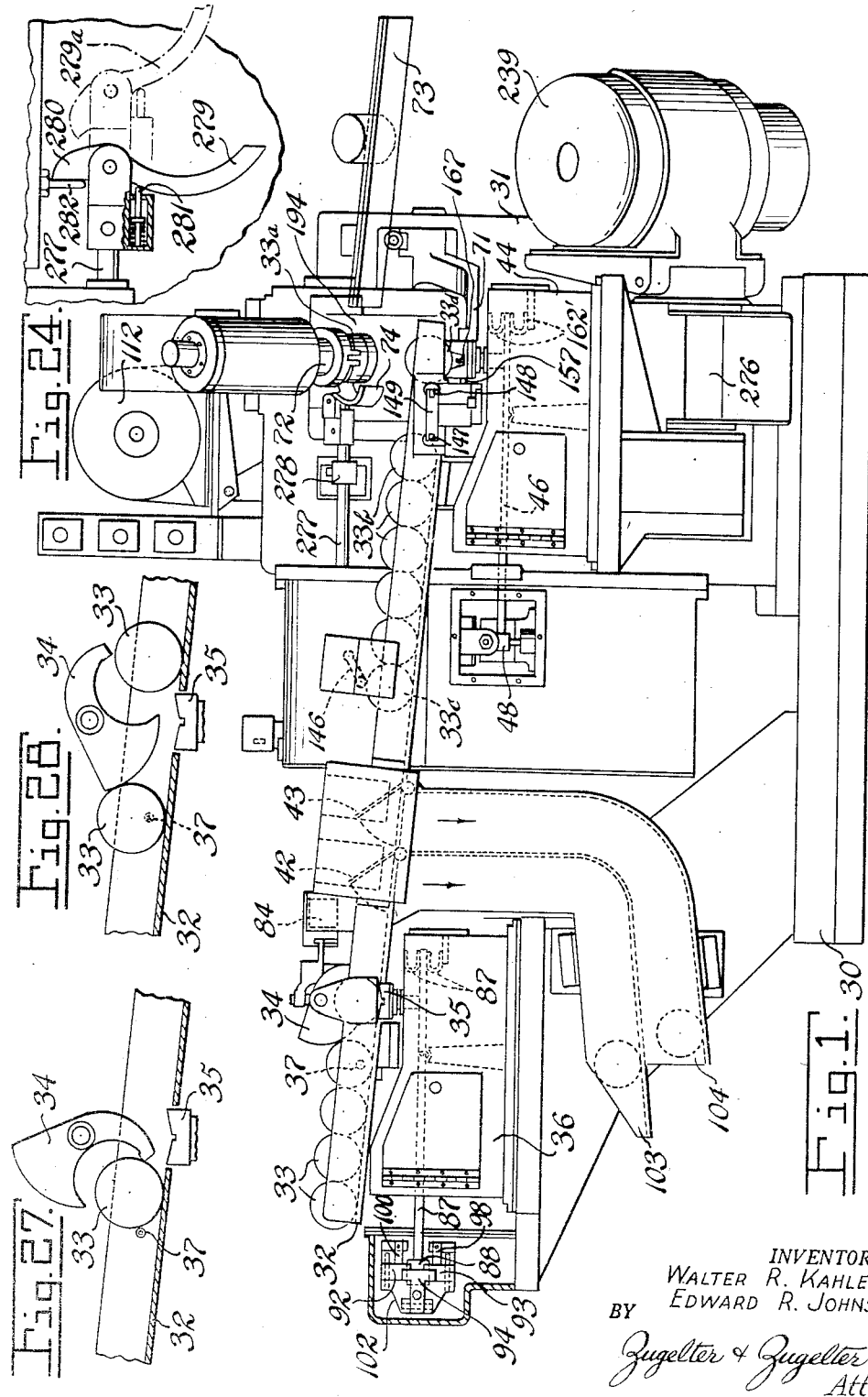

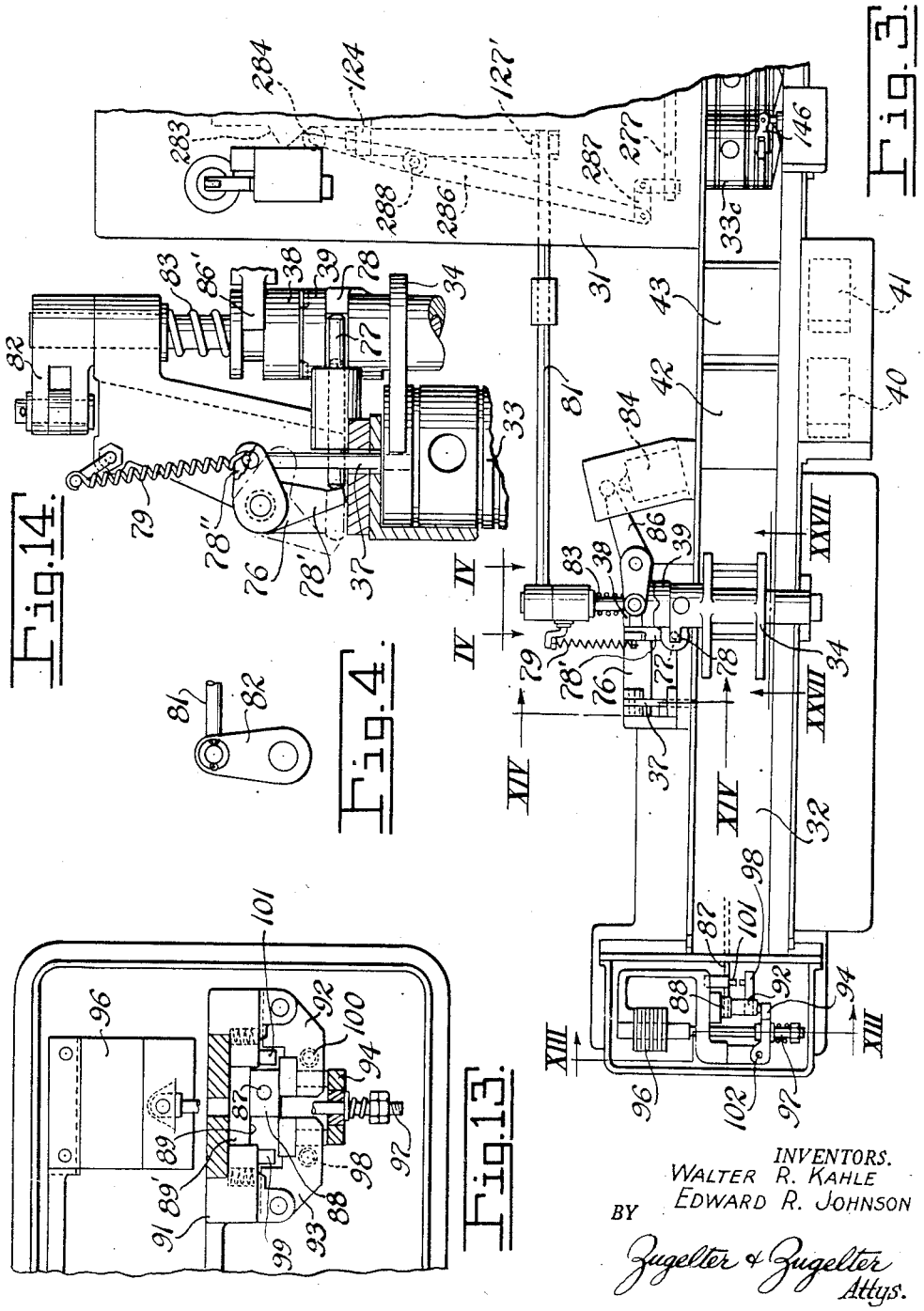

Nov. 23, 1954 W. R. KAHLE ET AL 2,694,960
PISTON WEIGHING AND TRIMMING MACHINE
Filed Dec. 22, 1949 11 Sheets-Sheet 4
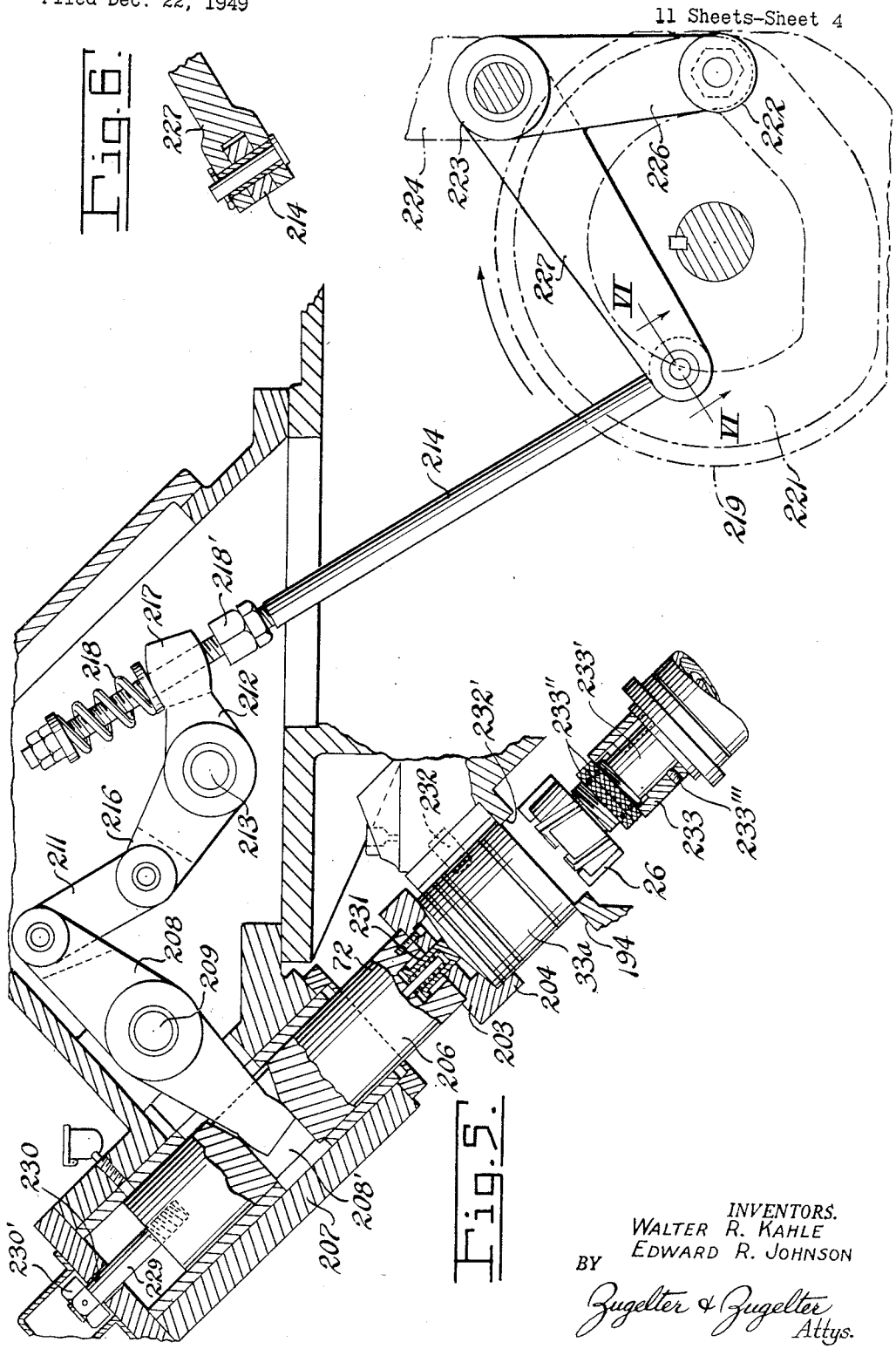
INVENTORS.
WALTER R. KAHLE
EDWARD R. JOHNSON
BY
*Zugelter & Zugelter*
Attys.

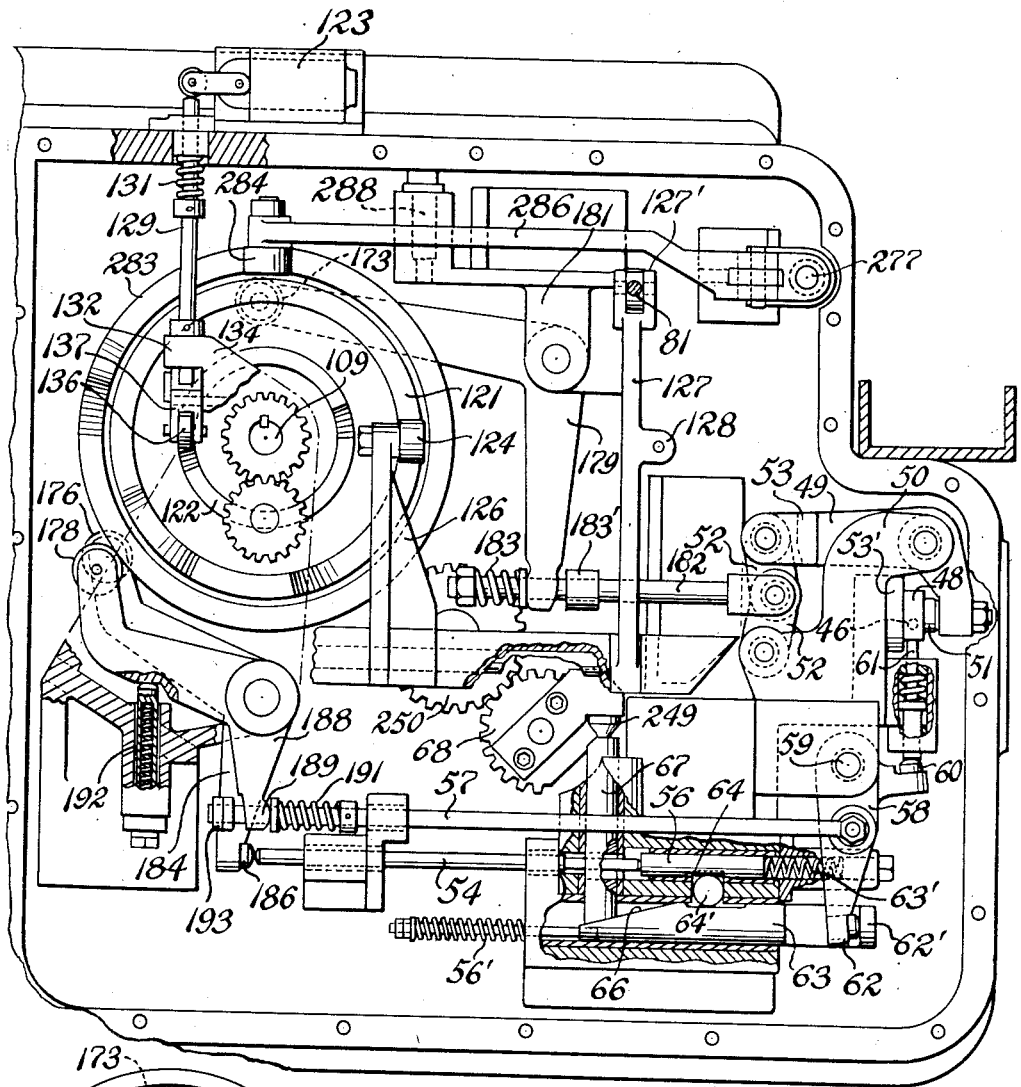
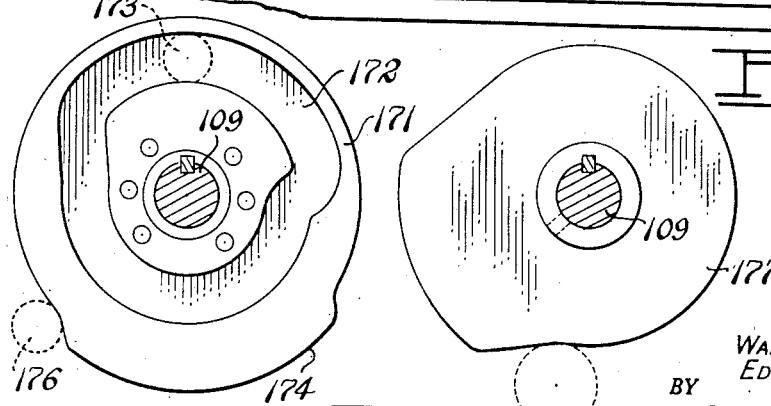

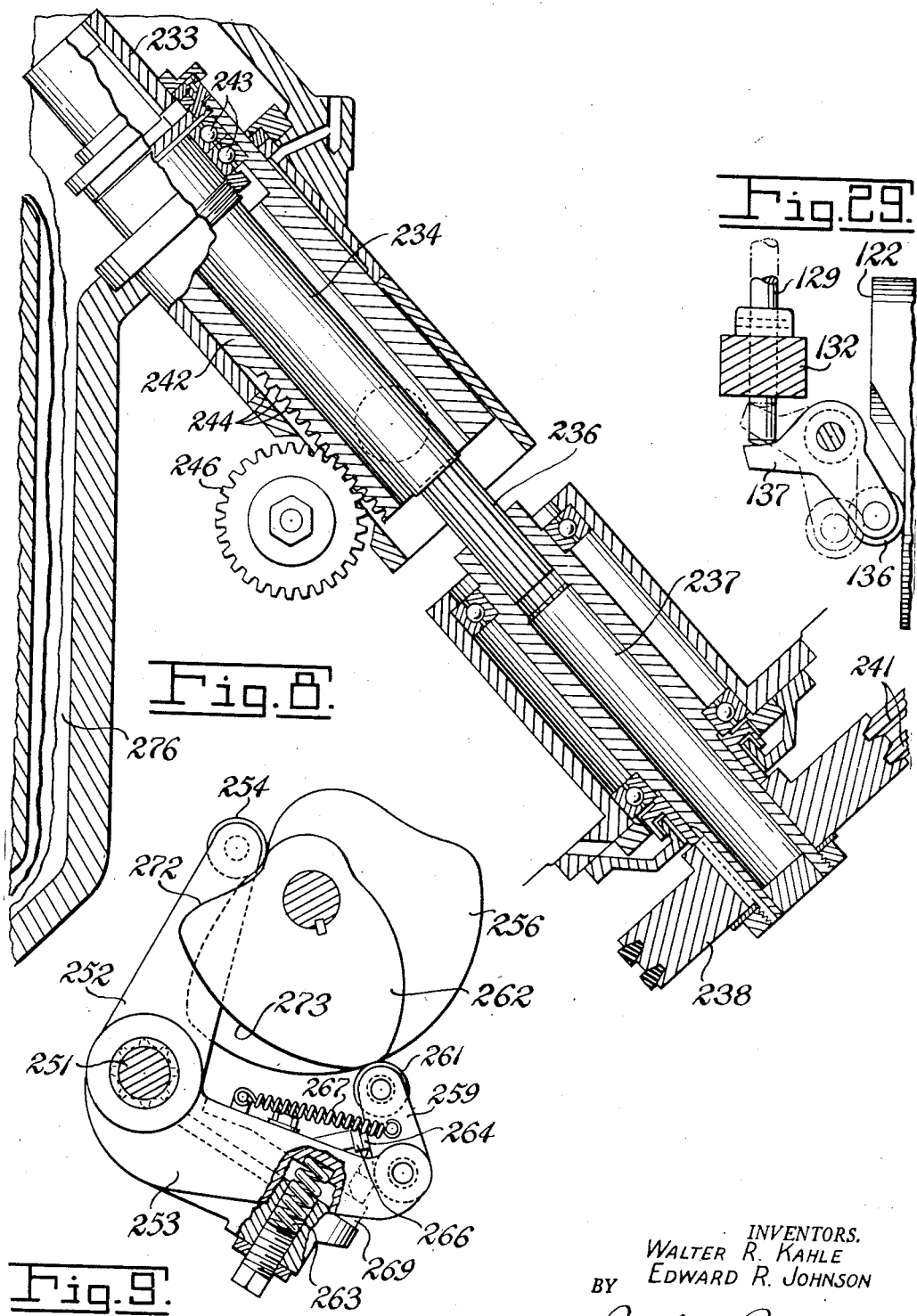

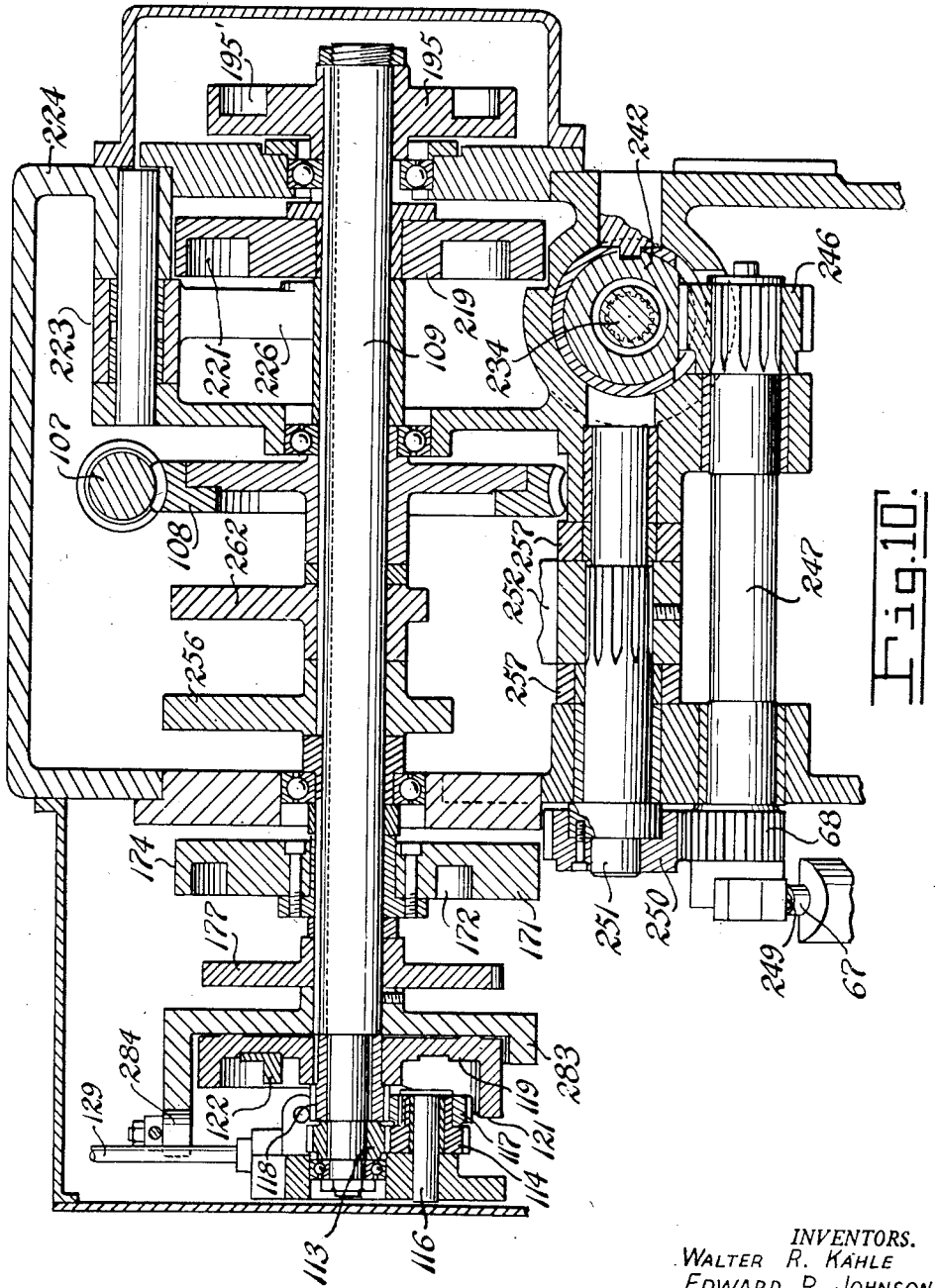

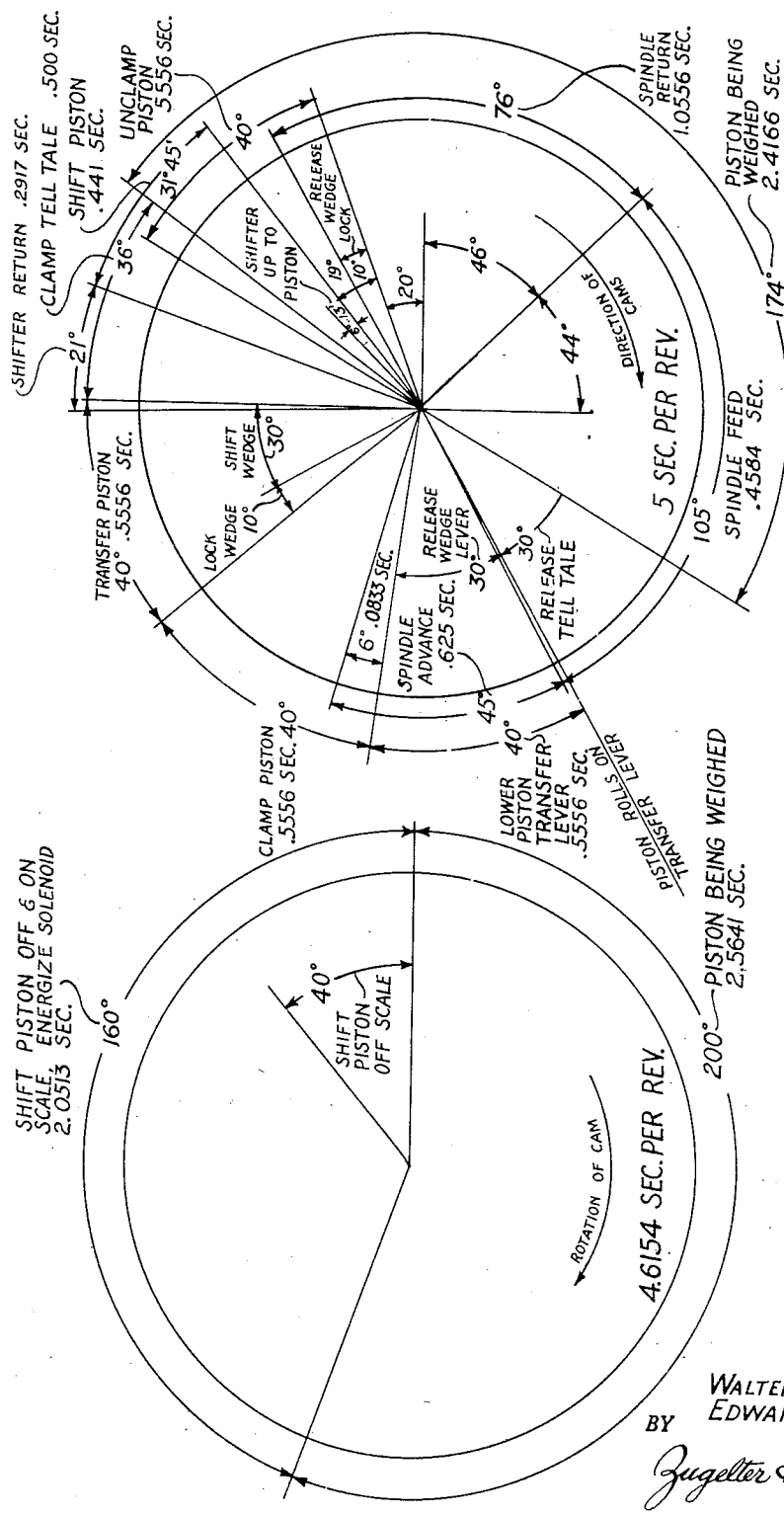

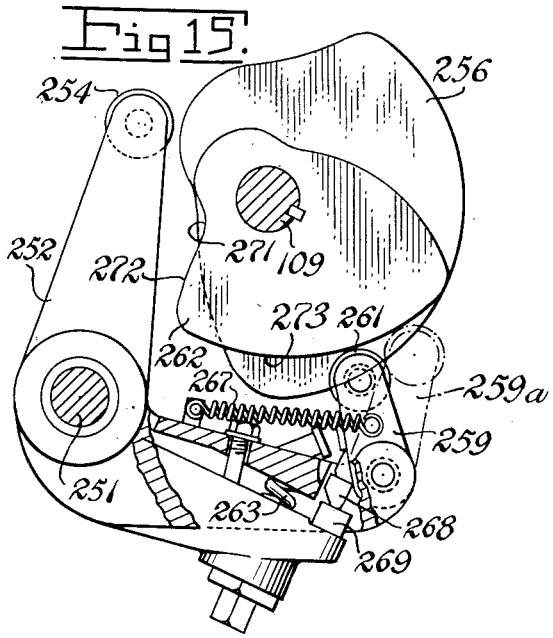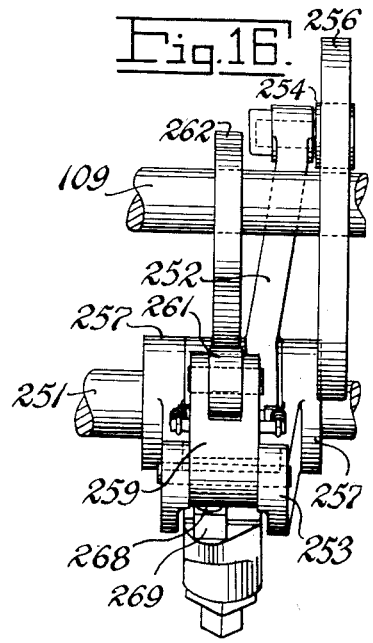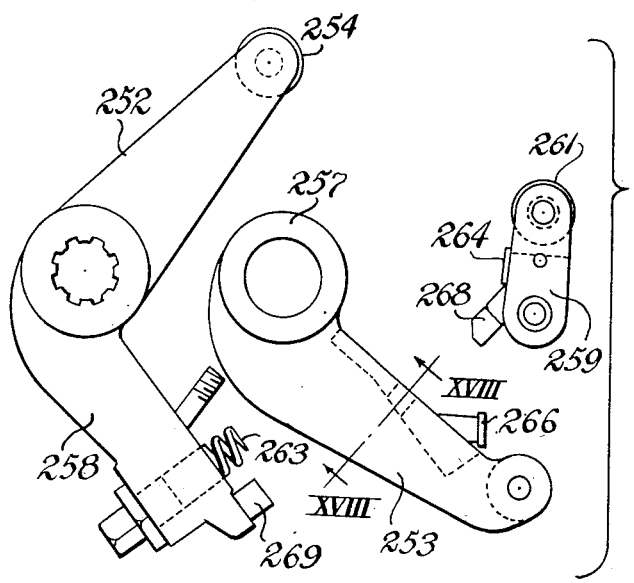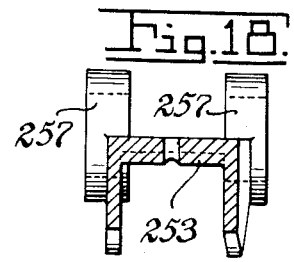

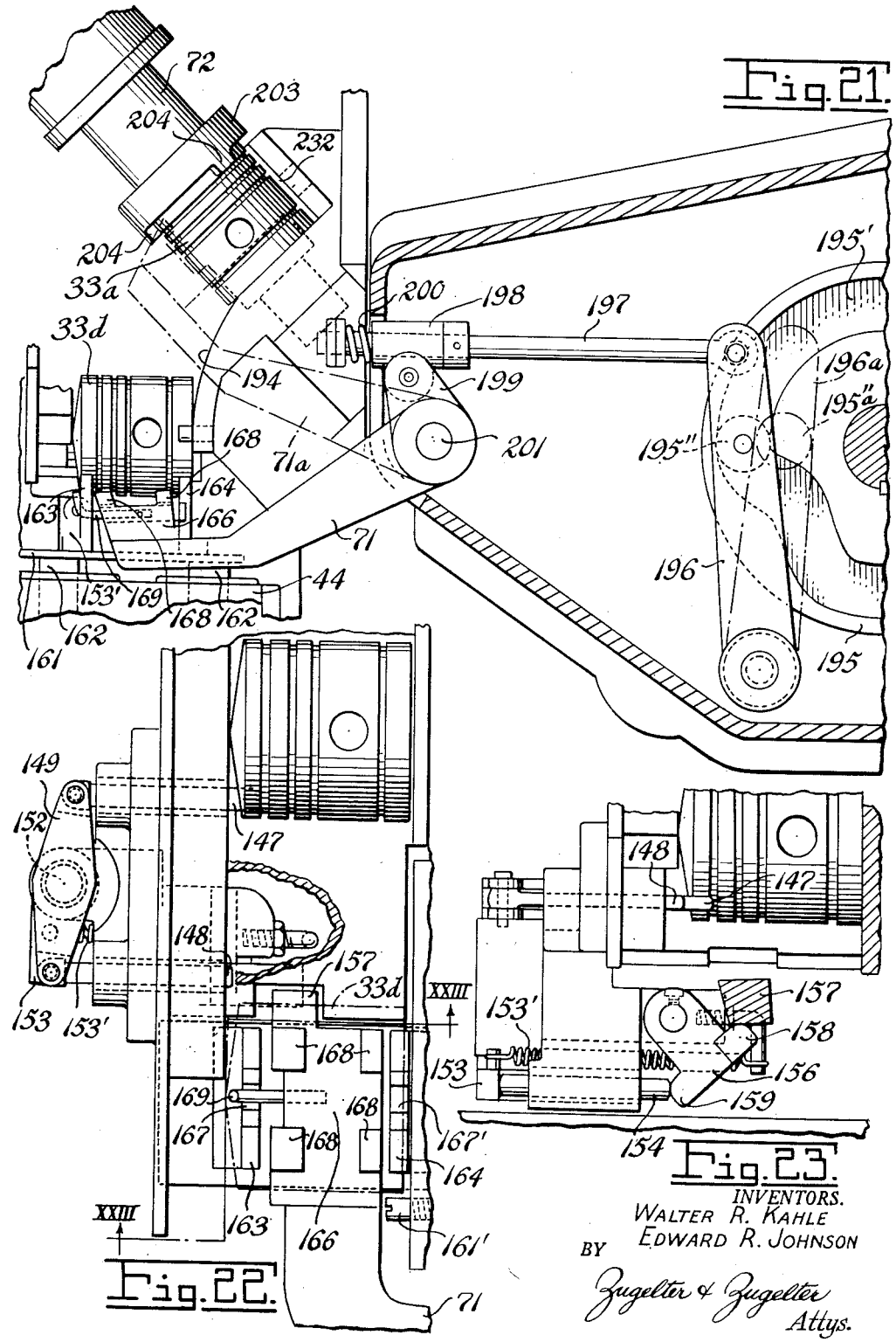

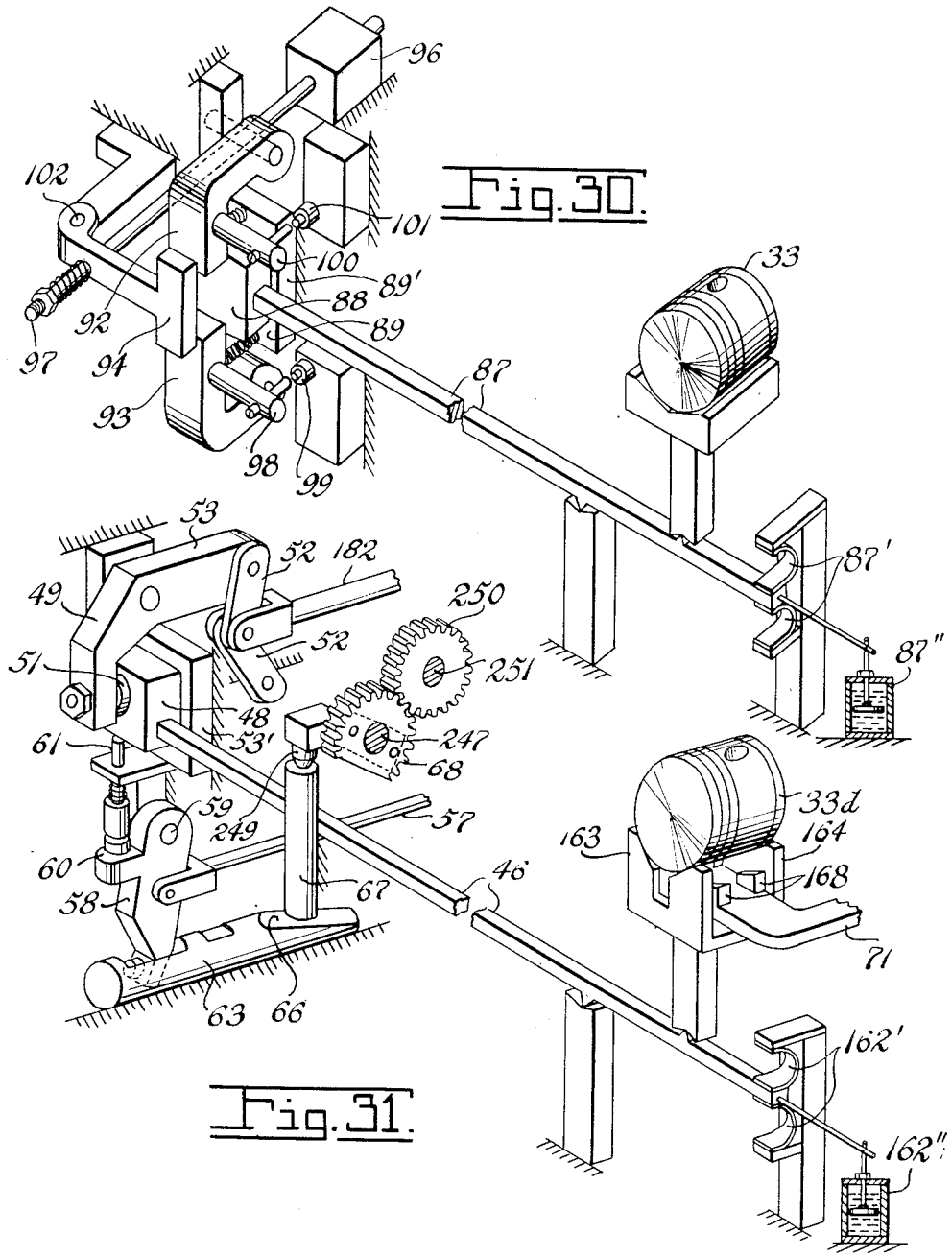

United States Patent Office 2,694,960
Patented Nov. 23, 1954

2,694,960

PISTON WEIGHING AND TRIMMING MACHINE

Walter R. Kahle and Edward R. Johnson, Cincinnati, Ohio, assignors to The Morris Machine Tool Company, Cincinnati, Ohio, a corporation of Ohio Application December 22, 1949, Serial No. 134,400

22 Claims. (Cl. 90—11)

This invention relates to a machine for weighing and trimming or balancing pistons of the type employed in internal combustion engines and the like and more particularly relates to a machine for automatically weighing a piston, determining the exact amount the weight of the piston exceeds a predetermined piston weight and then automatically effecting the removal of the excess weight so that pistons of equal weight are delivered by the machine.

Pistons used in an automotive engine or the like are required to be of uniform weight in order that the engine will be well balanced and smooth in operation. Such pistons are usually cast and aluminum alloy pistons are die cast. Pistons cast in identical molds vary in weight substantially. Molded pistons may be machined to dimension etc., and seldom does a piston which has been machined to a final or finished state have the exact or designed weight. The machine embodying our invention is designed to receive pistons which have been finished except for weight determination from a feeder. As each piston advances through the machine, it is weighed. If the piston weighs less than the designed piston weight, it is rejected from the machine. If it weighs more than the designed piston weight and the excess weight exceeds a predetermined maximum the piston is rejected from the machine. But if the piston is overweight and the overweight is equal to or less than the maximum, it passes on to a trimmer in the machine, which removes a weight of metal corresponding to the exact amount of overweight, the accuracy attainable being within ± one gram. Each of the pistons upon which our machine is designed to operate is provided with pads located within the skirt thereof and adjacent its bottom or open end. The pads may be milled away in whole or in part for lowering the weight of the piston to the designed weight. If the piston by chance happens to be of the exact or designed weight it passes through the machine but the trimmer is set to zero cut and no metal is removed.

An object of this invention is to provide a machine for automatically weighing and trimming pistons to lower the weight of each piston to a predetermined value.

A further object of this invention is to provide a piston weighing and trimming machine which has a scale for automatically weighing pistons one at a time and a metal cutter controlled by the scale for automatically trimming a sufficient amount of the metal from each piston to bring the weight down to the predetermined value.

A further object of this invention is to provide a machine for weighing and trimming pistons which includes a conveyor for leading pistons to the scale and which further includes a selector scale in the conveyor and release mechanism controlled by the selector scale for discharging a piston from the conveyor if the weight of the piston is less than the predetermined value or greater than a maximum weight which can be accommodated by the machine.

A further object of this invention is to provide a machine of this type for weighing and trimming a hollow piston having a closed end and an open end inside which a trimmable weight pad is disposed, which machine includes a jig for holding the piston with its open end facing the metal cutter and means for advancing the cutter into the open end of the piston to remove a sufficient amount of the metal of the weight pad to reduce the weight of the piston to the predetermined minimum value.

A further object of this invention is to provide a piston weighing and trimming machine of this type which includes a test finger advanceable across the conveyor thereof axially of a piston when the piston is disposed opposite the finger so that the finger can enter the open end of the piston if the open end faces the finger and the finger strikes the head of the piston if the head of the piston faces the finger together with a piston arrester controlled by the finger for stopping the piston in the event that the piston is improperly oriented in the conveyor.

A further object of this invention is to provide a piston weighing and trimming machine having a scale for automatically weighing pistons one at a time which scale is provided with a movable beam or telltale for registering the weight of each piston, the machine further having means for clamping the beam and means for pre-setting the depth of cut of a metal cutter that trims the piston, the depth setting means being controlled by the beam in clamped position.

A further object of this invention is to provide a selector or grading scale in a machine of this type which automatically operates an electric switch to actuate a piston release if a piston weighed by the selector scale has a weight less than the predetermined value or greater than a predetermined maximum value which can be accommodated by the machine.

Briefly the piston weighing and trimming machine includes a conveyor along which pistons can roll to be advanced one at a time onto a scale where each piston is weighed. The weight of each piston, is recorded by the position of a beam or telltale which forms a part of the scale. The scale records the weight of the piston and controls the setting of a limit device in the machine which presets the depth of cut to be made by a metal cutter actuated by the machine. When the weight of a piston has been registered by the scale beam, the piston is transferred to a jig which holds the piston with its open end facing the metal cutter. The metal cutter is advanced into the piston to trim a sufficient amount of metal from the piston to bring the weight thereof to a predetermined value. While one piston is being trimmed, another piston is being weighed and the depth of cut setting for the other piston is made. When the first piston has been trimmed or finished, it is discharged and the other or following piston is transferred to the jig for trimming. While each piston is being trimmed, the scale is released so that it can weigh the next or following piston.

A selector or grading scale may be disposed in the run of the conveyor. The selector scale is provided with a release actuated by the selector scale for discharging any piston which weighs less than the predetermined minimum value or more than a predetermined maximum value which can be accommodated by the machine.

The above and other objects and features of the invention will in part be apparent and will in part be obvious from the following detailed description, and the drawings, in which:

Figure 1 is a view in front elevation of a piston weighing and trimming machine constructed in accordance with an embodiment of this invention;

Fig. 2 is a view in side elevation showing the machine illustrated in Fig. 1;

Fig. 3 is a fragmentary plan view of the machine, partly broken away and in section to illustrate details of the selector scale mechanism, part of the grader scale controlled switches being removed for clarity;

Fig. 4 is a fragmentary view in elevation taken along a line IV—IV in Fig. 3 showing a crank which operates a piston indexing device associated with the selector scale;

Fig. 5 is a sectional view partly in elevation, showing details of the jig or chuck which holds piston during trimming together with a cam, a cam follower, and linkage for actuating the jig;

Fig. 6 is a sectional view taken along a line VI—VI in Fig. 5;

Fig. 7 is a somewhat schematic view partly in section and partly in elevation showing linkages of a limit device for presetting the depth of cut and also showing details of cams and cam followers for actuating a piston discharging device and for actuating a solenoid switch which forms a part of the controls for the selector scale;

Fig. 8 is a sectional view showing details of a spindle which actuates the metal cutter;

Fig. 9 is a view in section showing details of cams and cam followers for advancing and retracting the spindle;

Fig. 10 is a lengthwise sectional view showing details of cams for actuating the various parts of the machine;

Fig. 11 is a diagram showing operations controlled by the selector scale;

Fig. 12 is a diagram showing operations controlled by the main or cutter controlling scale;

Fig. 13 is an enlarged sectional view taken along a line XIII—XIII in Fig. 3, part of an actuator rod being removed for clarity of detail;

Fig. 14 is an enlarged sectional view taken along a line XIV—XIV in Fig. 3, part of the supporting members being broken away for clarity of detail;

Fig. 15 is a view in side elevation, partly broken away and in section for clarity of detail showing the cams and cam followers which advance and retract the spindle, the cams and cam followers being shown displaced from the positions shown in Fig. 9;

Fig. 16 is a view in rear elevation of the cams and cam followers illustrated in Fig. 15;

Fig. 17 is an exploded view showing the cam followers illustrated in Figs. 9, 15, and 16 together with supporting mechanism for the cam followers;

Fig. 18 is a view in section taken along a line XVIII—XVIII in Fig. 17;

Fig. 19 is a sectional view showing details of a cam which actuates locking mechanism of the scale beam and a stop bar;

Fig. 20 is a sectional view showing details of a cam which shifts a wedge which forms a part of the mechanism for locking the spindle stop;

Fig. 21 is a sectional view, partly in elevation, showing details of a transfer arm for raising a piston from the cutter controlling scale to a metal cutting station;

Fig. 22 is a plan view, partly broken away and in section of a piston advancing mechanism for advancing pistons onto the cutter controlling scale, the piston at the weighing station being shown in dot-dash lines;

Fig. 23 is a view in section partly in elevation of actuator mechanism for the piston advancer shown in Fig. 22 taken along a line XXIII—XXIII in Fig. 22, the scale pan being removed for clarity of detail;

Fig. 24 is a fragmentary view in side elevation partly broken away and in section showing details of a piston discharging device which forms a part of the machine;

Fig. 25 is a lengthwise sectional view, partly in elevation, of a piston adapted for trimming by the piston weighing and trimming machine, the piston being shown in relation to a cutting tool;

Fig. 26 is a sectional view taken along a line XXVI—XXVI in Fig. 25;

Fig. 27 is a fragmentary sectional view taken along a line XXVII—XXVII in Fig. 3 showing the indexing yoke in piston receiving position;

Fig. 28 is a fragmentary sectional view taken along the same line as Fig. 27 showing the indexing yoke in piston discharging position;

Fig. 29 is a fragmentary sectional view showing details of a crank for actuating a switch which forms a part of the machine;

Fig. 30 is a somewhat schematic view showing the selector or grading scale and switch actuating mechanism associated therewith; and Fig. 31 is a somewhat schematic view showing the scale which limits the depth of cut together with a linkage and other apparatus controlled thereby.

In the following detailed description and the drawings, like reference characters indicate like parts.

The machine of this invention is designed for weighing and trimming a piston of the type shown generally in Figs. 25 and 26. The piston is generally conventional in form. It includes a hollow generally circularly cylindrical body 20 having an open end and a closed head 21. The piston is provided with conventional wrist pin holes 22 and circumferential slots 23 for receiving piston rings. A pair of trim metal pads 24 are provided one on each side of and adjacent the open end of the piston skirt. The pads 24 are designed to have a given maximum thickness and weight so that when trimmed to a lesser thickness, metal having a weight corresponding to the overweight of the piston is removed. The lower edges of the pads are disposed a predetermined distance indicated as (x) from the open end of the piston when the piston is formed. The pads are shown in Fig. 25 in the condition following trimming. The outline of the bottom of the pads prior to trimming is indicated in dot-dash lines at 25 in Fig. 25. The depth of cut is indicated at (d). The dimensions of the pads of all pistons of a given design are identical so that when a cutting tool 26 is advanced into the open end of the piston a distance (d), a predetermined amount of the pads is trimmed away whereby the weight of the piston is reduced to the designed value. If the piston is of the designed weight so that no metal need be removed from the weight pads 24, the cutter 26 advances only a distance (f) to bring the cutter to a zero cut position at which no metal is removed from the piston. The machine is adapted to weigh pistons one at a time and set the total distance the cutting tool shall advance into a given piston to remove a sufficient amount of metal from the pads 24 of each piston to reduce the weight thereof to the predetermined or designed value.

In Fig. 1 a machine for weighing and trimming pistons is shown generally. The machine includes a base 30 on which is mounted an appropriate framework 31. The framework 31 supports a conveyor 32 and other mechanism of the machine. The conveyor 32 is generally of channel shape and pistons 33 travel down the conveyor and along the machine under the influence of gravity. The pistons may be introduced into the machine at the upper end of the conveyor 32 and roll to an indexing yoke 34 which advances the pistons along the conveyor one at a time onto the pan 35 of a scale 36 where the pistons are initially weighed and weight graded. Prior to reaching the yoke 34, the pistons pass a testing mechanism shown in Figs. 3 and 14 which includes a test finger or feeler 37 which can be advanced across the conveyor. If a piston is disposed in inverted position in the conveyor, the feeler 37 strikes the head of the piston and a linkage controlled by it (hereinafter described in greater detail) serves to lock the yoke 34 and cause yoke 34 to remain in a position where it blocks the passage of pistons until the inverted piston has been removed or placed in the proper position. While the yoke is locked, clutch jaws 38 and 39, which are in the yoke drive, may slip past each other.

The scale 36 is a selector scale and is adapted to selectively control the energization of solenoids 40 and 41 which are arranged to open and close doors 42 and 43 (Figs. 1 and 3) in the bottom of the conveyor, whereby those pistons which are over or under the weight tolerances are rejected from the machine. Pistons of suitable weight roll on down the conveyor and over the doors 42 and 43 to a second scale 44 which records the weight of each piston as it rests on the pan of the scale 44. The scale 44 controls mechanism for setting the depth of cut.

The weight of each piston is recorded by the position of a beam 46, which forms a part of the scale 44. When the beam 46 comes to rest, the beam is clamped in place to record the weight of the piston and the position at which the scale beam 46 is locked determines the depth of cut to be made by the milling cutter. In Fig. 7 is shown the mechanism for presetting the depth of cut. When the scale beam 46 comes to rest, a block 48 mounted on the scale beam is clamped in position by a bell crank clamping member 49. The member 49 is pivoted upon a frame element 50 between the ends of the member 49. A pad 51 is carried by one arm of the clamping member 49 and is forced against the block 48 when toggle links 52 are actuated into alignment to raise the other arm 53 of the clamping member. The block 48 is locked against a stationary vertical pad 53' which is attached to the framework of the machine. When the block 48 has been clamped in position, a push rod 54 is driven to the right as shown in Fig. 7 to release a locking member 56. When the locking member 56 has been released, a spring 56' draws a wedge block 63 to the left. When the locking member 56 is released, a push rod 57 is driven to the right to turn a twin-headed crank 58 counterclockwise as shown in Fig. 7. The crank 58 is pivotally attached to the framework of the machine and pivots about a pin 59. As the twin-headed crank 58 turns, one head 60 thereof raises a pin 61 until the pin comes in contact with the bottom of block 48. At the same time, the other head 62 of the twin-headed crank engages a lip 62' of the wedge block 63 and drives the wedge block to the right until the twin-headed crank 58 is stopped. The pin 61 engages the lower surface of the block 48 to stop the crank 58. When the crank 58 is stopped the push rod 54 moves to a position where the locking member 56 is released. When released, the locking member 56 is moved to the left as shown in Fig. 7 by a spring 63' to a position where an inclined plane surface 64 thereof engages the upper side of a lock roller 64' and forces the lock roller against the block 63 locking the block 63 in place. The block 63 includes a plane surface 66 inclined at a relatively small angle to the axis thereof which surface 66 limits the movement of a vertical stop rod 67. The stop rod 67 in turn limits the rotation of a gear 68 associated with mechanism for advancing the feed of the metal cutting tool 26.

Referring now to Figs. 1 and 2, when a piston has been weighed on the cutter setting scale 44, the piston is raised from the scale to a cutting station by means of a transfer arm 71. A piston at the cutting station is designated at 33a. At the cutting station a power chuck or jig 72 is forced down upon the piston to hold the piston at the cutting station while the cutting tool is advanced along the axis of the piston internally thereof to mill away a sufficient amount of the metal of the piston to reduce the piston weight to the predetermined value. When the piston pads have been trimmed, the cutting tool is retracted from the piston and the piston is transferred by a pusher 74 (Fig. 1) to the right, as shown in Fig. 1, from the cutting station 33a onto a discharge conveyor 73 by which the finished piston is delivered to any appropriate receptacle.

The machine which to this point has been described in general terms will now be described in greater detail.

When the pistons have been delivered to the upper end of the conveyor 32 they roll to the indexing yoke 34. The yoke 34 arrests movement of the piston before it is transferred onto the pan of the selector scale 36 until each piston has first been tested by means of the position testing device shown in Figs. 3 and 14. The testing device includes the feeler or test finger 37 which is advanced across the conveyor 32 at regular intervals. The feeler 37 is actuated by a crank 76 pivotally supported by the framework of the conveyor. Crank 76 is actuated by a vertically mounted pin 77 which is moved downwardly by means of an arm 78 which rocks up and down as the yoke 34 indexes the pistons. As arm 78 moves the push pin 77 downwardly the crank 76 is turned in a clockwise direction to force the finger 37 across the conveyor to the position indicated in dot-dash lines in Fig. 14. The pin 77 acts on an arm 78' of the crank 76. A spring 79 connected to arm 78' retracts the feeler 37 and raises the pin 77 when the yoke arm 78 rocks up. If the piston is properly oriented in the conveyor, the test finger 37 enters the open end of the piston and yoke 34 is not restrained. However, if a piston is reversed in the conveyor and disposed with the closed end or head thereof facing the test finger 37, the finger strikes the head of the piston and the test finger and yoke 34 are restrained by the piston. When the test finger 37 is restrained, as when a piston is improperly oriented in the conveyor, the push pin 77 and the arm 78 are held in raised position, and the arm 78, which is attached to the indexing yoke 34, prevents the indexing yoke from rocking.

The indexing yoke 34 serves to advance pistons one at a time onto the pan of the selector scale 36 for weighing, and, after weighing, discharges each piston to the conveyor run beyond the scale. The indexing yoke 34 is oscillated by a reciprocating rod 81, Fig. 3, and a crank 82 (Fig. 4). The clutch jaws 38 and 39 are disposed between the crank 82 and the indexing yoke 34 so that when the clutch jaws slip or are released, the yoke 34 remains stationary. As shown in Fig. 3, the clutch jaws may be of the type having V-shaped teeth. The clutch jaws are normally held in engaged position by means of a spring 83. However, when arm 78 is restrained, as when a piston is improperly oriented in the conveyor 31, the clutch jaws slip over one another thereby preventing indexing of pistons so long as the test finger 37 engages the head of a piston. The clutch teeth normally remain in engagement so long as the load on the clutch is small, as during normal operation of the indexing yoke. However, when heavily loaded, the clutch teeth have a wedging action which causes the jaws to separate, as when the test finger strikes the head of an improperly oriented piston. In addition, the clutch 38 may be disengaged by means of clutch releasing mechanism which includes a solenoid 84 and a clutch releasing lever 86 actuated by the solenoid 84. The lever 86 is pivoted to the framework of the machine between the ends thereof. A clutch shifting fork 86' connects one arm of the lever to the movable clutch jaw 39 while the other arm of the lever 86 is actuated by the solenoid, and when the solenoid 84 is energized, the clutch jaws are separated.

The yoke 34 swings from the position shown in Fig. 27 in which it can receive a piston from the conveyor, to the position shown in Fig. 1 where the piston rests on the pan of the selector scale 36. The yoke 34 remains stationary in the position shown in Fig. 1 for a sufficient period to permit the scale 36 to record the weight of the piston. When the piston is disposed on the scale 36, there is a small clearance between the yoke and the piston so that the yoke does not interfere with the piston during weighing. Then the yoke moves to the position shown in Fig. 28 to discharge the piston from the selector scale 36.

The weight of the piston on the pan of the selector scale 36 is indicated by the position of a scale beam 87. The greater the weight of the piston, the higher the position is at which the left hand end of the scale beam comes to rest (Fig. 1). The scale 36 has been shown diagrammatically only, and it is to be understood that appropriate mechanism is disposed within the scale so that the position of the scale beam properly indicates the weight of the piston. The scale beam is restained by appropriate springs 87'. The dash pot 87'' dampens oscillation of the scale beam to cause it to come to rest rapidly.

A block 88 is attached to the free end of the scale beam 87. Details of mechanism controlled by the scale beam 87 and block 88 are shown in Figs. 1, 3, and 13. In Fig. 30, the selector scale and scale controlled mechanism are shown schematically. The block 88 moves up or down with the beam 87 as shown in Fig. 1, along and close to a machined face 89 (Fig. 13) of a block 89' which is attached to a scale bracket 91 suitably attached to the frame of the machine. Upper and lower L-shaped switch actuating plates 92 and 93 are pivotally secured to the bracket 91 with ends thereof overhanging the path of the block 88. A T-shaped actuator arm 94 is also pivoted on the bracket 91 and extends in front of the L-shaped switch actuator plates 92 and 93. A solenoid 96 actuates a pull rod 97 for resiliently urging the actuator arm 94 against the L-shaped plates 92 and 93 when the solenoid 96 is energized. As shown in Fig. 13, when the solenoid is energized, the T-shaped actuator arm 94 so moves the L-shaped actuator plates that inner ends thereof advance toward the block 88. If the block 88 is centrally disposed, both L-shaped plates engage the block. However, if the block 88 is above center, (to the right as indicated in Fig. 13), only the upper L-shaped actuator plate 92 is stopped by the block 88, while the lower L-shaped plate 93 is swung inwardly to cause an arm 98 thereof to engage a switch button 99 and actuate the switch thereof. If, on the other hand, the block 88 is below center, then the L-shaped plate 92 swings inwardly past the block 88, causing an arm 100 of the plate 92 to actuate a switch button 101. The T-shaped actuator 94 can move either actuator plate inwardly past the block 88. The hinge 102 about which the T-shaped actuator 94 swings is provided with sufficient play so that the T-shaped member can not only swing about the hinge 102 but also can wobble sufficiently upon the hinge for actuating one or the other of the L-shaped actuator plates. When the switch button 99 is actuated to closed position, solenoid 40 is energized, while switch button 101 controls the energization of the solenoid 41 (see Fig. 3). The solenoid 40 in turn acts, when energized, to raise the door 42 while the solenoid 41, when energized, serves to raise the door 43 so that, when one or the other of the solenoids is energized, the piston then on the scale is discharged through one or the other of the doors 40 and 41 when the yoke 34 advances the piston along the conveyor. As shown in Fig. 13, the block 88 is somewhat wider than the space between free ends of the L-shaped switch actuator plates 92 and 93, and, if the weight of a piston on the scale falls within the weight limits of tolerance of the machine, the block 88 comes to rest at a central position where both of the L-shaped switch actuator plates 92 and 93 engage the block. Therefore, when the solenoid 96 is energized and the block is clamped, neither of the switch buttons 99 and 101 is actuated. Consequently, neither of the doors 42 and 43 is opened when the indexing yoke 34 advances the piston off of the scale 36, and the piston, being of proper weight, rolls on down the conveyor. Overweight pistons are discharged through a discharge chute 103 (Fig. 1) communicating with the door 42 while underweight pistons are discharged through a chute 104 communicating with the door 43. Pistons of acceptable weight roll down to a position indicated at 33b in Fig. 1, and the pistons collect in a row ahead of the scale 44.

The sequence of operations of the reciprocating rod 81 which actuates the indexing yoke 34 and the solenoid 96 which clamps the beam of the scale 36 is shown in Fig. 11. Each piston is shifted onto the scale pan of the scale 36 while the scale beam is locked. Then, the scale beam is released for a sufficient time to permit the scale beam to move to a position corresponding to the weight of the piston. Next, the solenoid is energized to lock the scale beam in its weight indicating position. If the piston is over- or underweight, the corresponding solenoid is energized to open either the over- or underweight door. Finally, the piston is shifted off the scale 36 and another piston is advanced onto the scale.

As indicated in Figs. 11 and 12, which indicate the time sequence of operations in a preferred embodiment of the invention, one cycle of the operations involving the selector scale 36 takes a somewhat shorter time than the cycle of operations involving the cutter setting scale 44. Timing of the operations is controlled by a series of cams shown in Fig. 10. The cams are driven by a worm 107 and worm wheel 108 keyed to a cam shaft 109. The worm 107 may be driven by any suitable power source, such as an electric motor 112 (Figs. 1 and 2). As shown in Fig. 2, the motor 112 drives a belt 112' which in turn drives a pulley 112''. The worm 107 and the pulley 112'' may be mounted on the same shaft.

The cam shaft 109 (Fig. 10) actuates a series of cams keyed thereto which will be described in greater detail hereinafter and which synchronize the operation of mechanism controlled by the cutter setting scale. In addition, the shaft 109 drives a gear 113 which in turn drives a pinion 114 mounted on a stub shaft 116. A gear 117 keyed to the pinion 114 drives a gear 118 mounted to rotate on the cam driving shaft 109 in the same direction as the shaft 109 but at a higher rotative speed. A compound cam member 119 is secured to and rotates with the gear 118. The compound cam member 119 (Figs. 7 and 10) includes an outer face cam 121 which drives the yoke rocking rod 81 and an inner face cam 122 which drives a solenoid actuating switch 123 (Fig. 7). The switch 123 in turn is connected by appropriate wiring, not shown, to the scale locking solenoid 96.

The linkage for reciprocating the yoke operating rod 81 is shown in Fig. 7. A cam follower roller 124 follows the cam 121 and swings a crank arm 126 forward, as shown in Fig. 7, as the cam follower rides up the surface of cam 121. A crank arm 127 swings forward with the crank arm 126. An end of the actuator rod 81 is pivotally attached to a clevis 127' at the top of the arm 127 so that when the cam follower 124 rides up the surface of cam 121, the rod 81 is driven forward, as shown in Fig. 7 and to the left as shown in Fig. 3. An appropriate spring (not shown) may be attached to an ear 128 on the arm 127 to draw the rod 81 back and hold the cam following roller 124 against the surface of cam 121.

The solenoid switch 123 is actuated by a vertical push rod 129 (Fig. 7) which is normally urged downwardly by a spring 131. The push rod 129 moves up and down in a vertical sleeve bearing 132 appropriately mounted on a frame member 134 of the machine partly indicated in dot-dash lines in Fig. 7. A cam follower roller 136 rides on the surface of cam 122 and swings a crank 137 (Fig. 29) pivotally supported on the frame member 134. When the cam follower roller 136 rides up the surface of cam 122, the crank 137 is swung clockwise, as shown in Fig. 29, to the position shown in dot-dash lines to raise the push rod 129.

Referring again to Fig. 1, when a suitable number of pistons has collected in the row indicated at 33b, the last piston, indicated at 33c, comes to rest beneath a swinging switch arm 146 to hold the switch arm in raised position. The switch arm 146 actuates an appropriate switch, not shown in detail, for energizing the clutch operation solenoid 84 so that when a suitable number of pistons have collected in position ahead of the second scale 44, the solenoid 84 is energized to disconnect the clutch jaws 38—39 and prevent undue piling up of pistons.

Pistons are advanced one at a time to the second scale 44 by means of a piston advancing mechanism shown in detail in Figs. 21, 22, and 23. The pistons roll along the conveyor and are arrested by a pair of pins 147 and 148 which are advanced alternately across the conveyor thereby to release the foremost piston and arrest the one immediately behind it. The pins 147 and 148 are pivotally supported at opposite ends of a swinging lever 149. The lever 149 is carried at the head of a vertical shaft 152 rotatably mounted on the framework of the machine. An actuator arm 153 is attached to the lower end of the shaft 152 and extends from one side of the bottom of the shaft substantially parallel to the lever 149. A spring 153' normally holds the lever 149 in the position at which the pin 148 is disposed in the conveyor. A horizontal sliding pin 154 (Fig. 23) extends through the framework of the machine into contact with the arm 153, and a bell crank 156 drives the pin 154 to the left, as shown in Fig. 23, when the bell crank turns in a clockwise direction. The bell crank 156 is actuated by means of an ear 157 which forms a part of the piston transfer arm 71. When the transfer arm 71 is in lowered position, as shown in Figs. 1, and 21 to 23, the ear 157 bears on an arm 158 of the crank 156 forcing the other arm 159 of the crank against the pin 154 to drive the pin to the left cocking the lever 149 in the position shown in Fig. 22 at which time pin 147 extends crosswise of the conveyor. When lever 149 is in this position, a piston is released to the position indicated at 33d in Fig. 1 where the piston rests on the pan 161 of the scale 44 and is weighed. When the transfer arm 71 is raised, it picks up the piston 33d and transfers it to the station 33a, and the pin pushing lever is released to its normal position with the pin 148 extending into the conveyor and the pin 147 retracted so that the next piston can roll down against pin 148. Then, when the transfer arm 71 is again lowered, the pin pushing lever 149 again swings to the position shown in Figs. 22 and 23 so that another piston can roll onto the scale pan 161. A pin 161' attached to the framework of the machine prevents the piston from rolling past the scale pan.

As shown in Fig. 21 the scale pan 161 is supported by a pair of pillars 162 which extend into the housing of the scale 44. As will be understood, appropriate scale mechanism, not shown in detail, links the pillars with the scale beam so that the position of the scale beam indicates the weight of the piston 33d. In Fig. 31, the scale 44 and scale controlled mechanism are shown schematically. Appropriate springs 162' restrain the scale beam. A dash pot 162'' dampens oscillation of the scale beam so that the scale beam rapidly comes to rest to indicate the piston weight. The scale pan 161 carries a pair of spaced upwardly extending piston support plates 163 and 164 having aligned V-notches 167 and 167' therein, between which the head 166 of the piston transfer arm 71 may operate. The piston 33d is supported in the V-shaped notches of the plates 163 and 164. While a piston is being weighed the transfer arm 71 is under the piston but does not touch either the piston or the scale pan. When the piston has been weighed and the depth of cut has been set, the transfer arm is raised, and the head 166 thereof lifts the piston off plates 163 and 164. The head of the transfer arm is provided with a central recessed portion in which the piston rides and upstanding arms 168 (Figs. 21 and 22) on opposite sides of the central portion which prevent the piston from rolling off the transfer arm. A hook 169 attached to the transfer arm prevents the piston from sliding off the end of the transfer arm as the piston is raised.

The piston remains on the pan of the scale 44 for a sufficient time to permit the beam of scale 44 to come to rest in a position corresponding to the weight of the piston. The scale beam 46 is then locked in that position and the mechanism of the machine presets the depth of cut to be made in the piston pads in accordance with the weight of the piston. The presetting mechanism is shown in Fig. 7 in detail and has already been described generally. The presetting mechanism is actuated by means of cams illustrated in Figs. 10, 19, and 20. A cam 171 (Figs. 10 and 19) acts to lock the scale beam and release the locking bar 56 (Fig. 7). The cam 171 includes a milled slot 172 along which a scale-locking cam follower 173 travels. In addition, the cam 171 has a peripheral cam surface 174 on which a cam follower 176 travels. Follower 176 is disposed to release the wedge locking bar 56 at the proper time. A cam 177 (Figs. 10 and 20) is provided with a peripheral cam surface along which a cam follower 178 travels to drive the twin-headed crank 58 (Fig. 7). Both of cams 171 and 177 rotate counterclockwise as shown in Figs. 7, 19, and 20.

The cam follower 173, which actuates the beam lock, is carried at one end of a bell crank 179 (Fig. 7) which bell crank 179 is pivotally mounted on a frame member 181. One arm of the bell crank 179 carries the cam follower 173. The other or lower arm of the bell crank 179 is slidably mounted upon an end of a pull rod 182. The pull rod 182 in turn is connected to the knee of the toggle links 52. When the cam follower 173 is raised as shown in Fig. 7, the lower arm of the bell crank 179 compresses a spring 183 disposed about the end of the pull rod 182 whereby the pull rod is yieldingly urged to the left to actuate the toggle links and clamp the scale beam. When the cam follower 173 is lowered, the lower arm of the bell crank engages a collar 183' on the pull rod to drive the pull rod to the right as shown in Fig. 7 to release the toggle links.

The cam follower 176, which follows the periphery of the double cam 171 is attached to an arm of a bell crank 184 pivotally attached to the framework. The other arm of the lever 184 carries a push pad 186 which can engage the left hand end (Fig. 7) of the rod 54 and drive the rod 54 to the right against the wedge locking member 56. As the member 56 is advanced to the right, the spring 63' is compressed and the spring 63' drives the member 56 and the push rod 54 to the left when cam 174 releases cam follower 176 allowing the bell crank 184 to turn clockwise. When the member 56 is moved to the left as shown in Fig. 7, the inclined plane surface 64 thereof engages the lock roller 64' and drives the lock roller against the block 63 locking the block 63 in place.

Th cam follower 178 is carried by an arm of a bell crank 188. The other arm of the bell crank 188 carries a push pad 189 which is slidable along an end of the push rod 57. The rod 57 carries a spring 191 and the push pad 189 bears on the spring and yieldingly urges the rod 57 to the right and swings the twin-headed crank 58 counterclockwise when the cam follower 178 is driven downwardly by the cam 177. The bell crank 188 is urged clockwise by means of a spring pressed pin 192, so that the cam follower 178 is held against the cam surface of the cam 177 at all times. When the cam follower 178 rides upwardly, the pad of the bell crank 188 engages lock nuts 193 on the rod 57 to draw the rod 57 to the left so that when the block 63 has been locked the pin 61 is released and the scale beam can be released to swing without interference from the pin 61.

When the scale beam 46 has been locked, the piston is raised by the piston transfer arm 71 from a position 33d (Fig. 1) to the cutting station 33a. As the piston is raised, the open end thereof rides up over a curved face 194 on the front of the machine. The mechanism for raising the piston is shown in Fig. 21. The piston is raised by the transfer arm 71 which is appropriately pivotally supported in the framework of the machine. The arms 168 of the transfer arm (see Fig. 22) and the hook 169 hold the piston in place as the piston is raised. The transfer arm 71 is swung in a clockwise direction, as shown in Fig. 2, and the arms 168 of the transfer arm lift the piston up off the scale pan for raising the piston.

The piston transfer arm 71 is actuated by a transfer cam 195 (Figs. 10 and 21) which includes a milled slot 195' along which a cam follower 195'' travels as the transfer cam 195 rotates. The cam follower 195'' is carried by a lever 196 pivoted at its lower end to the framework of the machine. The lever 196 swings from the position shown in full lines to the position shown in dot-dash lines at 196a as the piston is raised. A pull rod 197 is actuated by the cam 195 and cam follower 195''. The pull rod 197 is slidable along a sleeve 198 which is pivoted to a transfer arm actuating crank 199. The pull rod acts to compress a spring 200 when the pull rod is pulled to the right, and the spring 200 resiliently urges the transfer arm 71 in clockwise direction about a pivot pin 201 to raise the transfer arm to the position shown in dot-dash lines at 71a.

When the transfer arm has raised a piston to the position shown at 33a, the piston is clamped in place by means of the chuck or jig 72. The jig 72 includes a hollow-ended clamping head 203 having teeth 204 which fit around the head of the piston, as shown in Figs. 5 and 21. The jig actuating mechanism is shown in detail in Fig. 5. The jig actuating mechanism includes a slotted rod 206 which is reciprocably mounted in a housing 207, which housing is rigidly mounted on the framework of the machine. The rod 206 carries the clamping member 203 at its lower end. An actuating lever 208 raises and lowers the slotted rod 206. One end of the lever 208 fits into a slot 208' in the reciprocating rod 206. The lever 208 is centrally pivoted upon the framework of the machine and swings about a pivot pin 209. The other end of the lever 208 is raised and lowered by means of a toggle linkage which includes a toggle link 211 and toggle driving bell crank 212. The bell crank 212 is pivoted to the framework of the machine and swings about a pivot pin indicated at 213. A pull rod 214 drives the toggle linkage. A clevis 216 carried by one arm of the lever 212 is pivoted to an end of the link 211. The other arm 217 of the lever 212 is slidable along the pull rod 214. A spring 218 resiliently urges the lever 212 in a clockwise direction when the pull rod is urged downwardly. When the pull rod 214 is raised, a collar 218' thereon engages the arm 217 to raise the arm 217 and swing the toggle linkage to raise the clamping head 203.

The pull rod 214 is actuated by a cam 219 (Figs. 5 and 10). The cam 219 includes a slot 221 along which a cam follower 222 travels. The cam follower 222 actuates a bell crank 223 which is pivoted at its apex to a frame member 224. The bell crank 223 includes an arm 226 which carries the cam follower 222 and a second arm 227 which swings therewith and which is pivoted at its end to an end of the pull rod 214 (as shown in Fig. 6). When the cam 219 turns and the cam follower 222 is driven to the right, as shown in Fig. 5, the pull rod 214 is pulled downwardly to urge the jig 72 into clamping position. When, on the other hand, the cam follower 222 rides to the left as shown in Fig. 5, the pull rod 214 rises and the collar 218' engages the bell crank 212 swinging the bell crank 212 in a counterclockwise direction and causing the jig to rise from the piston.

A stop bolt 229 is attached to the head of the sliding rod 206 and limits the distance to which the rod can be lowered so that the rod is not driven from the sleeve 207 excessively in the event that the jig is actuated without a piston at the station 33a. The stop bolt 229 slides through an opening 230 in the head of the housing 207. A head 230' on the stop bolt engages the head of the housing to limit the movement of the rod 206.

A spring pressed pin 231 is disposed at the center of the lower end of the sliding rod 206 and acts to engage the head of the piston as the jig is lowered holding the piston in place until the teeth of the jig engage the head thereof. A spring pressed pin 232 is provided to prevent turning of the piston while in the jig. Pin 232 is positioned to enter one of the wrist pin holes of the piston when it is in the jig and lock it against turning while the cutter 26 starts to cut the metal from the weight pads. The chuck head 203 holds the piston 33a against the face 194 of the machine in such a position that the open end of the piston skirt faces an opening 232' in the face 194 through which the cutter 26 can be advanced to cut away the metal of the piston weight pads.

When the piston has been clamped in place by the jig 72 the metal cutter 26 is raised into the piston to trim the weight pads thereof. The mechanism for raising and lowering the metal cutter and for rotating the cutter is shown in Fig. 8. A hollow cutter mounting member or head 233 is disposed at the upper end thereof, and the end milling cutter 26 is attached to the member 233. As shown in Fig. 5, the cutter 26 is carried on a shaft 233' which extends into the head 233 and is keyed thereto. Adjusting nuts 233'' threaded on the shaft 233' may be used for setting the zero cut position of the cutter 26. A set screw 233''' holds the cutter shaft in the cutter mounting head 233.

As shown in Fig. 8, the head 233 is attached to and rotates with a spindle 234 having an externally splined lower end 236. The splines of the spindle are in engagement with internal splines of a hollow shaft. The shaft 237 in turn is keyed to a pulley 238. Belts 241 (Fig. 8) run on and drive the pulley 238. The motor 239 drives a pulley 241' (Fig. 2) which, in turn, drives the belts 241.

The hollow shaft 237 only rotates. The spindle 234 rotates with the shaft 237 and also may be advanced longitudinally thereof to raise and lower the cutter holding member 233 and cutter held thereby. A rack sleeve 242 encases the spindle 234, is spaced therefrom, and supports bearings 243 in which the spindle runs. The rack sleeve 242 is provided with rack teeth 244 which engage a pinion 246 by means of which the rack sleeve 242 and spindle 234 may be raised and lowered together. During operation of the machine, the spindle constantly rotates and, at appropriate intervals, the spindle is raised by the rack pinion 246 to move the cutter into position for removing the required amount of metal from the piston weight pads. As shown in Fig. 10, the rack pinion 246 is splined to a shaft 247 which carries the gear 68. The gear 68, as shown in Figs. 7 and 10, carries a stop pad 249 which comes into engagement with the top of the stop rod 67 to arrest rotation of the gear 68 and stop further advance of the spindle. The gear 68 is in mesh with a gear 250 on a spindle advance actuating shaft 251 on which are mounted a cam following bell crank 252 and a cam following crank arm 253 (Figs. 9 and 15–18). The bell crank 252 is splined to the shaft 251 while the crank arm 253 is rotatable on the shaft 251, as shown in Figs. 9, 10 and 15. The bell crank 252 carries a cam follower 254 that follows a spindle return cam 256 (see Fig. 10). As shown in Figs. 16, 17, and 18, crank arm 253 includes a pair of arms 257 which pivot about the shaft 251 on either side of the bell crank 252 and support the crank arm 253 in position as a saddle over the free or lower arm 258 of the bell crank. A cam following link 259 is pivoted to the free end of the crank arm 253 and carries a cam follower 261 which rides on a feed cam 262. A compression spring 263 extends between the saddle of the crank arm 253 and the lower arm 258 of the bell crank 252 and is compressed as the crank arm 253 is driven clockwise to urge the bell crank 252 in a clockwise direction. During spindle advance and feed, the link 259 is held in the position shown in Fig. 9. When in that position, a pad 264 on the link engages a pad 266 on the crank arm 253. Tension springs 267 hold the link in this position. As the feed cam 262 revolves, the link 259 is forced therefrom to drive the crank arm and the bell crank 252 clockwise as shown in Figs. 9 and 15 and cause the spindle to advance and feed the cutter into the weight pads until the spindle advance is stopped by the stop rod 67 (Fig. 7). Then, as the feed cam continues to drive the link 259 outwardly, the compression spring 263 is compressed as the crank arm 253 approaches the arm 258 of the bell crank 252. As the crank arm continues to be urged outwardly, a release finger 268 which is a part of the link 259 engages a release pad 269 of the bell crank 252, and further advance of the link 259 causes the link to turn in a clockwise direction to the position shown in full lines in Fig. 15. Finally, the link passes over center, to the position shown in dot-dash lines at 259a in Fig. 15 at which point feeding pressure is released. Thereafter, as the feed and return cams continue to rotate, the return cam 256 picks up the cam follower 254 whereby the bell crank 252 is returned counterclockwise and the spindle is retracted. When the spindle has been retracted, a low spot 271 (Fig. 15) on the feed cam comes opposite the link 259 so that the springs 267 can reset the link for the next sequence of operations. During the initial advance of the spindle the cam follower 261 follows a surface 272 having a steep slope so that the spindle and cutter are advanced rapidly to the zero-cut position at which cutting of metal commences. From the zero-cut position, the cam follower 261 follows a slow feed cam surface 273 on the feed cam which has a lesser slope than cam surface 272. While the cam follower 261 is on the surface 273 the spindle and cutting tool are advanced slowly as the weight pad metal is cut away. If the piston at the cutting station is of the predetermined or designed weight so that no metal need be trimmed from the weight pads thereof, the spindle and cutter are stopped at zero-cut position while if the piston is overweight, the spindle and cutter advance to make a cut determined by the overweight scale setting.

As the spindle is advanced, chips formed during the trimming operation are discharged through a chip chute 276 (Fig. 8). A vacuum line (not shown) may be attached to the chip chute for drawing off the chips.

When a piston has been trimmed, the jig 72 is released and the piston pusher 74 discharges the piston from the milling station 33a onto the discharge conveyor 73 (see Fig. 1). As shown in Fig. 2, the discharge conveyor is of L-shape. The piston can roll down the discharge conveyor to any suitable receptacle, not shown. The pusher 74 (Fig. 1) is driven by a push rod 277. The push rod 277 is slidable through a sleeve support 278. The pusher includes a curved plate 279 (Fig. 24) pivoted on the end of the push rod 277. The plate 279 is normally held in the position shown in dot-dash lines at 279a in Fig. 24 by means of a spring pressed pin 281 which is carried by the rod 277. When the pusher plate 279 is in this position, it catches the piston and transfers the piston to the discharge conveyor 73 as the push rod 271 is advanced to the right. When the rod 277 is fully retracted to the left as seen in Fig. 1, an arm 280 of the plate 279 engages a pin 282 which is attached to the framework of the machine. As the rod 277 is retracted, the plate 279 is swung to the position shown in full lines where it is out of the way of the transfer arm 71.

The rod 277 is driven by a cam 283 (Figs. 7 and 10). The cam 283 drives a cam follower 284 attached to an arm of a centrally pivoted lever 286. The other arm of the lever 286 is connected to the rod 277 by a link 287 (Fig. 3) and as the lever 286 swings about its pivot 288, the rod 277 is reciprocated and the piston discharge mechanism operated thereby.

The operation of the machine will be clear from the drawings and the foregoing detailed description. Pistons are introduced into the machine at the upper end of the conveyor 32 (Fig. 1) and roll to the indexing yoke 34. Before reaching the yoke 34, each piston rolls past the piston position or test feeler 37. So long as each piston is properly oriented in the conveyor 32, the test finger enters the open end of each piston. However, if a piston is inverted, the test finger strikes the head thereof and prevents the yoke 34 from indexing.

The yoke 34 advances properly oriented pistons onto the scale pan 35 where the yoke maintains each piston while the piston is weighed. The piston then is advanced by the yoke and, if of acceptable weight, rolls down to the section of the conveyor where pistons are shown lined up at 33b. If the piston is not of acceptable weight, it is discharged through one of the chutes 103 and 104. The sequence of these operations is shown diagrammatically in Fig. 11.

From the position 33b, pistons are advanced one at a time onto the scale pan of the scale 44 where each piston is again weighed. The weight of a piston at the second weighing station indicated at 33d is registered by the scale beam, and the scale beam is clamped in the position to which it is tilted by the weight of the piston. Mechanism controlled by this scale beam presets the depth of cut to be made on the piston weight pads. When the scale beam 46 has been clamped, the piston is raised to the cutting station 33a where it is clamped and then trimmed. While one piston is being trimmed at the cutting station 33a, another piston rolls onto the pan of the scale 44 and is weighed, and the depth of cut mechanism is adjusted according to the weight of that piston. The sequence of these operations is illustrated diagrammatically in Fig. 12.

When the first piston has been trimmed, it is unclamped and pushed onto the discharge conveyor 73 for removal from the machine.

The machine automatically selects pistons which can be handled by the machine and separates unacceptable pistons. Then each acceptable piston is weighed. The scale at the second weighing station controls mechanism which presets the depth of cut to be made by the cutting tool of the machine. The cutting tool automatically removes just enough of the metal of each piston that the acceptable pistons are all trimmed to the same predetermined weight.

The machine illustrated in the drawings and described in detail above represents a preferred embodiment of the invention, but the machine is subject to structural change, without departing from the spirit and scope of the appended claims.

Having described our invention, what we claim as novel and desire to secure by Letters Patent is:

1. A machine for weight balancing a finished piston having a weight pad on the inside of and integral with the skirt thereof said pad being between the wrist pin bearings and the open end of the skirt, said machine comprising means for weighing the piston, piston-conveying means for placing the piston on said piston-weighing means, a jig, a transfer arm, means for actuating the transfer arm in timed relation to the piston-conveying means, and causing the same to transfer the piston from the weighing means to the jig after the piston has been weighed on the weighing means, an end milling cutter having a spindle and a feed mechanism for advancing the spindle and end milling cutter into the open end of the piston skirt when the piston is held by the jig and into cutting relation with said weight pad, and means controlled by the weighing means for stopping the spindle feed at predetermined points between zero-cut and maximum cut positions in direct proportion to the amount that the piston weight exceeds a predetermined minimum value.

2. A machine according to claim 1 characterized by the fact that a discharge conveyor is disposed with its entry end adjacent the jig, that means are provided for withdrawing the cutter from the piston skirt in response to stopping of the feed of the milling cutter, and that means are provided operating in timed relation to the cutter withdrawing means for removing the piston from the jig and advancing the piston onto the discharge conveyor after the cutter is withdrawn from the piston skirt.

3. A machine for automatically removing metal from a piston in amount sufficient to reduce the weight of the piston to a predetermined value, said machine comprising a scale for weighing the piston, piston-conveying means for placing the piston on said scale, a metal cutter for trimming the piston, a jig for holding the piston during trimming, means controlled by the scale for pre-setting the depth of cut of the metal cutter, another piston-conveying means operating in timed relation with the first mentioned piston-conveying means, means for actuating said other piston-conveying means in timed relation to the first mentioned piston-conveying means to transfer the piston from the scale to the jig after the piston has been weighed on the weighing means, means operated in timed relation with the arrival of the piston in said jig for advancing the cutter into the metal of the piston to remove metal therefrom, and means for arresting advance of the cutter when the cutter has made a cut of predetermined depth in the metal of said piston.

4. A machine for automatically removing metal from a piston in amount sufficient to reduce the weight of the piston to a predetermined value, said machine comprising a scale for weighing the piston, a main conveyor for advancing the piston onto said scale, a metal cutter for trimming the piston, a jig for holding the piston during trimming, means controlled by the scale for presetting the depth of cut of the metal cutter, a transfer conveyor, means for actuating the transfer conveyor in timed relation to the main conveyor and causing the same to transfer the piston from the scale to the jig after the piston has been weighed on the scale, means operating in timed relation with the arrival of the piston in said jig for advancing the cutter into the metal of the piston to remove metal therefrom, means for arresting advance of the cutter when the cutter has made a cut of sufficient depth to reduce the weight of the piston to the predetermined value, and means for automatically releasing the piston from the jig and discharging the piston from the jig when trimmed.

5. A machine in accordance with claim 4 characterized by the fact that the jig is disposed above the scale, that the scale is provided with a scale pan having an upwardly extending piston-holding cradle, that the transfer conveyor includes an arm adapted to extend into said cradle and beneath a piston held in the cradle when the piston is being weighed on the scale, and that means are provided for actuating the transfer arm to raise the piston from the scale cradle to the jig.

6. A machine for automatically removing metal from pistons in amount sufficient to reduce the weight of each piston to a predetermined value, said machine comprising a scale for weighing the pistons, a main conveyor, means in said main conveyor for advancing pistons onto said scale one at a time, a metal cutter for trimming the pistons, a jig for holding pistons during trimming, means controlled by the scale for presetting the depth of cut of the metal cutter, a transfer conveyor, means for operating the transfer conveyor in timed relation with the main conveyor and causing the same to transfer each piston from the scale to the jig after the piston has been weighed on the scale, means operating in timed relation with the arrival of a piston at the jig for advancing the cutter into the metal of said piston to remove metal therefrom, means for arresting advance of the cutter when the cutter has made a cut of predetermined depth in the metal of said piston, the main conveyor being adapted to advance another piston onto the scale for weighing the other piston while the cutter trims said first piston, and means for automatically releasing and discharging said first piston from the jig when trimmed.

7. A machine for automatically removing metal from pistons in amount sufficient to balance the pistons, said machine comprising a main conveyor having in the run thereof a selector scale, means for delivering the pistons to the selector scale one at a time, means for arresting travel of each piston when on the selector scale, a release controlled by said selector scale for discharging a piston from the conveyor run if the piston weight is less than the predetermined value or greater than a maximum tolerable value, means for releasing pistons having a weight within the weight tolerances to proceed along the main conveyor, a second scale in said main conveyor run beyond the release, means for causing pistons to come to rest on said second scale one at a time, means controlled by the second scale for trimming sufficient material from the pistons to reduce the weight of each piston to a predetermined value, a jig for holding the pistons during trimming, a transfer conveyor for transferring pistons one at a time from the second scale to the jig, means operating in timed relation with the arrival of one of the pistons at the jig for actuating the material trimming means to remove material from the piston, and means for releasing and discharging said piston from the jig after trimming.

8. A machine for automatically removing metal from pistons in amount sufficient to reduce the weight of each piston to a predetermined value, each of said pistons being hollow and having an open and a closed end and having a weight pad on the inside thereof for trimming to reduce the weight thereof, said weight pad being accessible from the open end of the piston, said machine comprising scale means for weighing the pistons, a metal cutter, a gravity conveyor for advancing the pistons to said cutter one at a time, said pistons being adapted to roll along the gravity conveyor, a jig for holding each piston with the open end toward the metal cutter, a test pin advanceable crosswise of the gravity conveyor, means for arresting movement of each piston opposite the test pin, means for advancing the test pin across the gravity conveyor substantially axially of each piston when each piston is arrested, the pin being adapted to enter the open end of the piston or abut the closed end of the piston depending on the orientation of the piston in the gravity conveyor, and means controlled by the test pin for restraining advance of the pistons to the jig if one of the pistons is improperly oriented in the gravity conveyor.

9. A machine in accordance with claim 8, characterized by the fact that an indexing yoke is disposed in the run of the gravity conveyor, that the indexing yoke is adapted to advance the pistons along the gravity conveyor one at a time, and that a linkage is provided between the test pin and the yoke for arresting the yoke when the test pin strikes the head of a piston to prevent advance of pistons past the indexing yoke when one of the pistons is disposed in the gravity conveyor with its closed end facing the test pin.

10. A piston selecting and trimming machine which comprises a piston supplying conveyor, a scale in said conveyor for weighing pistons individually, scale-governed means for sorting pistons whereby the pistons are discarded into underweight and overweight classes or passed on as within predetermined tolerances, a second scale in said conveyor for individually weighing pistons passed on from the first scale as within tolerances to determine the amount of excess weight of each piston, a jig for holding one of said pistons during trimming, a transfer arm for transferring pistons from the platform of the second scale to said jig one at a time, means governed by the second scale for presetting the depth of cut of the cutter, means operated in timed relation with the arrival of a piston at the jig for trimming sufficient material from the piston to reduce the weight thereof to the predetermined value, and means for releasing and discharging the trimmed piston from the machine.

11. In a machine for weighing and trimming hollow cylindrical pistons, said pistons each having an open end and a closed head, said machine having an upwardly facing channel-shaped conveyor along which the pistons roll by gravity, a piston testing and advancing mechanism which comprises an oscillating yoke adapted to arrest the pistons in the conveyor run and advance the pistons along the conveyor one at a time, a shaft for oscillating said yoke, means for swinging said shaft back and forth to oscillate the yoke, a normally engaged overload releasing clutch between said yoke and said shaft swinging means, a test finger advanceable crosswise of the conveyor run ahead of the yoke, said yoke being adapted to hold each piston opposite the test finger, a linkage between the yoke and the test finger for driving the test finger crosswise of the conveyor and substantially axially of each piston as the piston is held opposite to the test finger, whereby when one of the pistons is held opposite the test finger, the test finger enters the open end of the piston if the open end of the piston faces the test finger and the test finger strikes the head of the piston if the head faces the test finger, the linkage between the test finger and the yoke being adapted to restrain the yoke to prevent oscillating thereof when the test finger strikes the head of one of the pistons to cause the clutch to slip and render the yoke inoperative for advancing pistons when one of the pistons is disposed in the conveyor with the head thereof facing the test finger.

12. A machine for automatically removing metal from pistons in amount sufficient to reduce the weight of each piston to a predetermined value, said machine comprising a conveyor having in the run thereof a selector scale, means for delivering the pistons to the selector scale, means for arresting travel of each piston when on the selector scale, a release controlled by said selector scale for discharging pistons out of the conveyor run if the weight thereof is less than the predetermined value or greater than a maximum tolerable value, said arresting means being adapted for releasing pistons from the selector scale to the conveyor run if the weight thereof is between the maximum tolerable weight and the predetermined weight, a second scale in said conveyor run, means for causing pistons to come to rest upon the second scale one at a time, means for holding each piston during metal removal, a transfer conveyor for transferring pistons one at a time from the second scale to the piston holding means, and means operating in timed relation with the arrival of a piston at the piston holding means and controlled by the second scale for trimming a sufficient portion from each piston to reduce the weight thereof to a predetermined value.

13. A machine for automatically removing metal from a piston having a removable weight pad in amount sufficient to reduce the weight of the piston to a predetermined value, said machine comprising a scale for weighing the piston, said scale having a movable beam, an index finger slidably mounted substantially perpendicularly to the beam, spring means normally urging said finger from the beam, whereby the beam normally swings freely to indicate the weight of the piston, a clamp for clamping the beam to record the weight of the piston, means for advancing the piston onto the scale, means for actuating the clamp to engage the beam when the piston has been disposed on the scale a predetermined time, an actuator member for advancing said index finger into contact with the beam, means operating in timed relation with the clamp for resiliently driving said actuator member to resiliently urge the index finger into contact with the scale beam when the scale beam is clamped, a slidably mounted locking stop rod, a driving connection between the actuator member and the locking stop rod for driving the stop rod when the actuator member urges the index finger into contact with the scale beam, the scale beam limiting the advance of the index finger and the locking stop rod, means for locking the locking stop rod in the position assumed when the index finger is in contact with the scale beam to record the weight indicated by the scale beam, said locking stop rod having a surface inclined to the axis thereof, a cutter stop bar slidably mounted at substantially a right angle to the axis of the locking stop bar, said cutter stop bar having an end portion adapted to engage the inclined surface of the locking stop bar, and means engageable with the opposite end portion of the cutter stop bar for setting the limit of advance of a tool as the tool cuts into the removable portion.

14. A machine in accordance with claim 13 characterized by the fact that the actuator member is a twin-headed crank, that one head of the twin-headed crank is adapted releasably to engage the index finger to drive the index finger into engagement with the scale beam, that the other head of the twin-headed crank is adapted releasably to engage the locking stop rod for advancing the locking stop rod, and that means are provided for retracting the twin-headed crank for releasing the heads thereof from engagement with the index finger and the locking stop rod when the locking stop rod is locked.

15. A machine in accordance with claim 13 characterized by the fact that the means for locking the slidably mounted locking stop rod comprises a lock bar slidably mounted parallel to and spaced from the locking stop rod, said lock bar having a cam surface facing the locking stop rod and inclined to the axis of the lock bar, a roll mounted between the lock bar and the locking stop rod, and means for driving the lock bar axially in a direction to cause the inclined cam surface thereof to engage the roll and hold the roll in engagement with the locking stop rod to lock the locking stop rod.

16. A machine in accordance with claim 13 characterized by the fact that the scale beam carries a block having opposed flat sides parallel to the path of movement of the scale beam, that a stationary clamping surface is disposed parallel to and closely spaced from one of said flat sides, that the clamp includes a pad adapted to engage the opposite side of the block to clamp the block against said clamping surface, and that the index finger is adapted to engage a surface on said block substantially perpendicular to said sides.

17. In a machine of the class described, a spindle feeding apparatus which comprises a spindle feed shaft, means connecting the spindle and the spindle feed shaft for advancing and retracting the spindle when the spindle feed shaft is turned in opposite directions, a cam follower carrying crank attached to said spindle feed shaft to turn therewith, a cam follower attached to said cam follower carrying crank, a second crank attached to said spindle feed shaft to rotate therewith, a saddle member rotatably mounted on said spindle feed shaft, a cam shaft spaced from and parallel to the spindle feed shaft, said saddle member being disposed between the second crank and the cam shaft, a drive link pivoted to the saddle member, a cam follower carried by said drive link, a spindle retracting cam on the cam shaft for driving the cam follower on the cam follower carrying crank to turn the spindle feed shaft in spindle retracting direction, a spindle advancing cam on the cam shaft, said spindle advancing cam being adapted to drive the link and saddle members in spindle advancing direction, spring means between the saddle member and the second crank for resiliently driving the spindle feed shaft in spindle advancing direction, spring means resiliently urging the link to swing toward the spindle feed shaft, cooperating abutments on the link and on the saddle member limiting swinging of the link toward the spindle feed shaft to normally dispose the drive link substantially radially of the cam shaft, an adjustable spindle stop adapted to limit advance of the spindle when the spindle has been advanced a predetermined distance, and cooperating abutments on the link and on the second crank for rotating the link away from the spindle feed shaft when the saddle member is advanced toward the second crank, whereby when the spindle stop limits advance of the spindle, the link is rotated away from the spindle feed shaft to a released position and the driving force between the spindle advancing cam and the spindle feed shaft is released.

18. A spindle feeding apparatus in accordance with claim 17 characterized by the fact that the spindle advancing cam is provided with a low spot and that the springs urging the link toward the spindle feed shaft are adapted to set the link with the cooperating abutments on the link and on the saddle member in engagement when the link is opposite the low spot on the spindle advancing cam.

19. In a machine for removing metal from the weight pad of a piston to bring its weight to a predetermined value, said machine including a device for setting a tool feed in a position that is proportional to the weight of metal to be removed from the pad, said device comprising a scale beam, a scale pan on said beam for supporting a piston, a block carried by said scale beam, means for locking said block against movement when the beam is at rest with a piston on said pan, a gauge member engageable with said block, means for bringing said gauge member into engagement with the block when the block is locked, and linkage connecting the gauge member with the tool stop for setting the limit of the cutting stroke of the tool into said weight pad.

20. In a machine for weight balancing a piston having a removable weight pad, a device for setting a stop for stopping the feed of a machine tool at a predetermined point for removing a predetermined portion of the weight pad which comprises a scale beam, a scale pan on said beam for supporting the piston, a block carried by said beam, a back-up plate on one side of said block, means for engaging the opposite side of the block for locking the block against the back-up plate when the beam is at rest with a piston on said pan, a gauge member engageable with said block, means for bringing said gauge member into engagement with the block when the block is locked, and linkage connecting the gauge member with the tool stop for setting the limit of advance of the tool as the tool cuts into the weight pad.

21. In a machine for weight balancing a piston having a removable weight pad, a device for setting a stop for stopping the feed of a machine tool at a predetermined point for removing a predetermined portion of the weight pad which comprises a scale beam, a scale pan on said beam for supporting the piston, a block carried by said beam, a back-up plate on one side of said block, means for engaging the opposite side of the block for locking the block against the back-up plate when the beam is at rest with a piston on said pan, a gauge member advanceable transversely of the scale beam and engageable with the block when the block is locked against the back-up plate, a crank having a pair of arms, one of said crank arms being engageable with the gauge member to drive the gauge member into engagement with the block, a reciprocating wedge block engageable by the other arm of the crank and advanceable thereby as the gauge member is advanced, said wedge block having a sloping face intersecting the axis of sliding thereof at a small angle, a reciprocating stop rod mounted for reciprocating substantially perpendicularly of the axis of reciprocation of the wedge block, one end of the stop rod being engageable with the sloping face, and a tool stop engageable with the other end of the stop rod for setting the line of advance of the tool as the tool cuts into the weight pad.

22. In a machine for weight balancing and trimming a finished piston, said machine having a scale means for weighing the piston and a jig for holding the piston during trimming, piston conveying means which comprise a sloping conveyor leading to the scale pan, said scale pan having a pair of spaced support members for holding the piston, means for releasing pistons one at a time to advance onto the scale pan, a transfer arm having a cradle advanceable between the support members and engageable with a piston on said pan to raise the piston from the pan, and means operating in timed relation with the piston releasing means for raising said cradle to lift the piston from the scale means to the jig.

References Cited in the file of this patent

UNITED STATES PATENTS

| Number | Name | Date |
|---|---|---|
| 1,908,786 | Pioch | May 16, 1933 |
| 1,979,959 | Coleman | Nov. 6, 1934 |
| 2,060,958 | Taylor | Nov. 17, 1936 |
| 2,243,379 | Johnson | May 27, 1941 |
| 2,288,690 | Eddison et al. | July 7, 1942 |
| 2,351,879 | Sandberg | June 20, 1944 |
| 2,371,077 | Strauss | Mar. 6, 1945 |
| 2,411,110 | Pruitt | Nov. 12, 1946 |

FOREIGN PATENTS

| Number | Country | Date |
|---|---|---|
| 591,557 | Germany | Jan. 23, 1934 |